US012795427B2

(12) United States Patent
Gürsu et al.

(10) Patent No.: US 12,795,427 B2
(45) Date of Patent: Nov. 10, 2026

(54) RANDOM ACCESS CHANNEL STEERING BASED ON NETWORK SLICING

(71) Applicant: Nokia Technologies Oy, Espoo (FI)

(72) Inventors: Halit Murat Gürsu, Munich (DE); Malgorzata Tomala, Wroclaw (PL); Ömer Bulakci, Munich (DE); Muhammad Naseer-Ul-Islam, Munich (DE)

(73) Assignee: Nokia Technologies Oy, Espoo (FI)

(*) Notice: Subject to any disclaimer, the term of this patent is extended or adjusted under 35 U.S.C. 154(b) by 306 days.

(21) Appl. No.: 18/578,091

(22) PCT Filed: Aug. 4, 2021

(86) PCT No.: PCT/EP2021/071782
§ 371 (c)(1),
(2) Date: Jan. 10, 2024

(87) PCT Pub. No.: WO2023/011713
PCT Pub. Date: Feb. 9, 2023

(65) Prior Publication Data
US 2024/0314847 A1 Sep. 19, 2024

(51) Int. Cl.
*H04W 4/00* (2018.01)
*H04W 24/10* (2009.01)
(Continued)

(52) U.S. Cl.
CPC ....... *H04W 24/10* (2013.01); *H04W 74/0833* (2013.01); *H04W 74/0836* (2024.01)

(58) Field of Classification Search
CPC ................................................. H04W 74/0833
See application file for complete search history.

(56) References Cited

U.S. PATENT DOCUMENTS

2013/0301541 A1* 11/2013 Mukherjee ........ H04W 74/0833 370/329
2017/0367120 A1* 12/2017 Murray ................ H04B 7/2603
(Continued)

FOREIGN PATENT DOCUMENTS

CN 116762427 A * 9/2023 ........ H04W 74/0833
ES 2796049 T3 * 11/2020 ........ H04W 74/0833
(Continued)

OTHER PUBLICATIONS

"New WID on enhancement of RAN Slicing for NR", 3GPP TSG RAN Meeting #91e, RP-210912, Agenda Item: 9.1.2, CMCC, Mar. 16-26, 2021, 4 pages.
(Continued)

*Primary Examiner* — Elisabeth Benoit Magloire
(74) *Attorney, Agent, or Firm* — Lippes Mathias LLP

(57) ABSTRACT

The present disclosure relates to a technique for steering a Random Access Channel (RACH) a wireless communication network supporting a set of network slices. More specifically, the technique involves generating, at a RAN node, RACH steering information for the set of network slices. The RACH steering information comprises an indication for a UE to select one of available RACH configurations with a RACH configuration-specific probability. In one embodiment, the RACH steering information may be defined based on at least one network slice-specific RACH policy or at least one network slice-specific resource sharing quota provided from a network management entity to the RAN node. In another embodiment, the RAN node may generate RACH steering information based on locally available information about the set of network slices. Once the RACH steering information is generated, the RAN node transmits it to the UE. By using the RACH steering information, it is possible to dynamically adjust a RACH load among multiple network slice-specific RACH configura-
(Continued)

tions and common RACH configurations, thereby efficiently balancing the RACH load (i.e., RACH utilization rate) across the set of network slices.

19 Claims, 10 Drawing Sheets

(51) Int. Cl.
*H04W 74/0833* (2024.01)
*H04W 74/0836* (2024.01)

(56) References Cited

U.S. PATENT DOCUMENTS

| | | | | |
|---|---|---|---|---|
| 2018/0167979 | A1* | 6/2018 | Guo | H04W 74/0833 |
| 2019/0174561 | A1 | 6/2019 | Sivavakeesar | |
| 2019/0215861 | A1* | 7/2019 | Son | H04L 5/001 |
| 2019/0230584 | A1 | 7/2019 | Lou et al. | |
| 2019/0327663 | A1 | 10/2019 | Wirth et al. | |
| 2020/0314913 | A1* | 10/2020 | Rastegardoost | H04L 5/0048 |
| 2021/0058977 | A1* | 2/2021 | Yang | H04W 74/0833 |
| 2021/0105702 | A1 | 4/2021 | Jiang | |
| 2021/0227586 | A1* | 7/2021 | Huang | H04W 74/0833 |
| 2022/0183081 | A1* | 6/2022 | Tao | H04W 76/20 |
| 2022/0304074 | A1* | 9/2022 | He | H04W 74/0841 |
| 2023/0171810 | A1* | 6/2023 | Belleschi | H04W 74/0833 370/329 |
| 2024/0306209 | A1* | 9/2024 | Liu | H04W 72/231 |

FOREIGN PATENT DOCUMENTS

| | | | | |
|---|---|---|---|---|
| WO | WO-2018030953 A1 * | 2/2018 | | H04W 74/0833 |
| WO | 2021/093173 A1 | 5/2021 | | |
| WO | WO-2021239895 A1 * | 12/2021 | | H04W 74/0833 |
| WO | WO-2021239899 A1 * | 12/2021 | | H04W 74/0833 |

OTHER PUBLICATIONS

"3rd Generation Partnership Project; Technical Specification Group Radio Access Network; NR; Medium Access Control (MAC) protocol specification (Release 16)", 3GPP TS 38.321, V16.5.0, Jun. 2021, pp. 1-157.
"3rd Generation Partnership Project; Technical Specification Group Radio Access Network; NR; NR and NG-RAN Overall Description; Stage 2 (Release 16)", 3GPP TS 38.300, V16.6.0, Jun. 2021, pp. 1-152.
"3rd Generation Partnership Project; Technical Specification Group Radio Access Network; NG-RAN; Xn application protocol (XnAP) (Release 16)", 3GPP TS 38.423, V16.6.0, Jul. 2021, pp. 1-464.
"3rd Generation Partnership Project; Technical Specification Group Services and System Aspects; System architecture for the 5G System (5GS); Stage 2 (Release 17)", 3GPP TS 23.501, V17.1.1, Jun. 2021, pp. 1-526.
"3rd Generation Partnership Project; Technical Specification Group Core Network and Terminals; Numbering, addressing and identification; (Release 17)", 3GPP TS 23.003, V17.2.0, Jun. 2021, pp. 1-144.
"Msc-generator", Sourceforge, Retrieved on Jan. 3, 2024, Webpage available at : https://sourceforge.net/projects/msc-generator/.
"Further discussion on slice specific RACH", 3GPP TSG RAN WG2 Meeting #114-e, R2-2104741, Agenda item: 8.8.3, Qualcomm Incorporated, May 19-27, 2021, pp. 1-10.
"3rd Generation Partnership Project; Technical Specification Group Core Network and Terminals; Non-Access-Stratum (NAS) protocol for 5G System (5GS); Stage 3; (Release 17)", 3GPP TS 24.501, V17.3.1, Jun. 2021, pp. 1-825.
Chen et al., "Random Access for Network Slicing", Proceedings of ACM Mobimedia conference, Jul. 2017, 6 pages.
"IEEE 802.11", Wikipedia, Retrieved on Jan. 3, 2024, Webpage available at : https://en.wikipedia.org/wiki/IEEE_802.11.
"3rd Generation Partnership Project; Technical Specification Group Services and System Aspects; Telecommunication management; Study on management and orchestration of network slicing for next generation network (Release 15)", 3GPP TR 28.801, V15.1.0, Jan. 2018, pp. 1-75.
"3rd Generation Partnership Project; Technical Specification Group Services and System Aspects; Management and orchestration, 5G Network Resource Model (NRM); Stage 2 and stage 3 (Release 17)", 3GPP TS 28.541, V17.3.0, Jun. 2021, 450 pages.
International Search Report and Written Opinion received for corresponding Patent Cooperation Treaty Application No. PCT/EP2021/071782, dated May 2, 2022, 12 pages.
"Further considerations of slice based RACH", 3GPP TSG RAN WG2 Meeting #114-e, R2-2104874, Agenda Item: 8.8.3, Intel Corporation, May 19-27, 2021, 7 pages.
"Further discussion on slice-based PRACH configuration", 3GPP TSG RAN WG2 Meeting #114-e, R2-2105213, Agenda item: 8.8.3, Lenovo, May 19-27, 2021, 6 pages.
Office action received for corresponding European Patent Application No. 21755457.5, dated Feb. 12, 2025, 6 pages.

* cited by examiner

RANDOM ACCESS CHANNEL STEERING BASED ON NETWORK SLICING

RELATED APPLICATION

This application was originally filed as PCT Application No. PCT/EP2021/071782 on Aug. 4, 2021, which is incorporated herein by reference in its entirety.

TECHNICAL FIELD

The present disclosure relates generally to the field of wireless communications and, in particular, to techniques for performing a Random Access Channel (RACH) procedure in a wireless communication network that supports network slicing.

BACKGROUND

The next generation of wireless communication networks (e.g., fifth-generation (5G) networks) is expected to support different network slices. Each network slice can be considered as an independent network partition optimized to support the performance requirements of a certain application or service category. For example, a wireless communication network may comprise a first network slice designed to support an "Enhanced Mobile Broadband (eMBB)" service category, a second network slice designed to support an "Ultra-reliable and Low Latency Communications (ULLC)" service category, and a third network slice designed to support a "Internet of Things (IoT)" application category. It should be also noted that a particular type of network slice may be deployed multiple times (i.e., have multiple instances) within the same wireless communication network. For example, a network operator may deploy multiple IoT slice instances to support multiple IoT customers, such as utility companies, entertainment companies, etc.

To support several service categories, it is required for the same UE to connect to multiple network slices. A RACH procedure is usually used during each initial access when the UE wants to join a particular network slice. As targeted by 3rd Generation Partnership Project (3GPP) Release 17 (Rel-17), network slice-specific RACH configurations would be introduced, meaning that different RACH resources and RACH configurations could be configured for different network slices, including two-step and four-step network slice-specific RACH procedures as well as associated fallback mechanisms. In addition, 3GPP Rel-17 also recites some common RACH configurations that can be used by all UEs, again also including the two-step and four-step common RACH resources and the associated fallback mechanisms. All these configurations provide the flexibility to introduce specialized RACH configurations for special network slices/services but, at the same time, cause additional complexity. More specifically, these configurations require the RACH resources (which are limited) to be divided into different categories like network slice-specific, common, etc. This may lead to a higher RACH resource fragmentation which should be done carefully. Moreover, the network slice-specific and common RACH configurations introduce a lot of possibilities for the fallback mechanisms. For example, there may be a fallback mechanism for switching from a two-step network slice-specific RACH procedure to a four-step network slice-specific RACH procedure, or a fallback mechanism for switching from the two-step network slice-specific RACH procedure to a two-step common RACH procedure, or a fallback mechanism for switching from the two-step network slice-specific RACH procedure to a four-step common RACH procedure, etc. However, not all such combinations would be required as this introduces quite some additional complexity as well as a requirement to configure additional RACH resources for each category.

Therefore, there is a need for a technique that would allocate the RACH resources among the available network slices more efficiently, so that the UE could use an optimal RACH configuration considering a current RACH load across the network slices. Moreover, such a technique should provide an optimal fallback mechanism that would minimize the RACH resource fragmentation and reduce the overall procedure complexity.

SUMMARY

This summary is provided to introduce a selection of concepts in a simplified form that are further described below in the detailed description. This summary is not intended to identify key features of the present disclosure, nor is it intended to be used to limit the scope of the present disclosure.

It is an objective of the present disclosure to provide a technical solution that allows a RACH to be effectively steered in a wireless communication network with network slicing.

The objective above is achieved by the features of the independent claims in the appended claims. Further embodiments and examples are apparent from the dependent claims, the detailed description and the accompanying drawings.

According to a first aspect, a Radio Access Network (RAN) node in a wireless communication network supporting a set of network slices is provided. The RAN node comprises a transceiver, a processor coupled to the transceiver, and a memory coupled to the processor and storing processor-executable instructions. When executed, the processor-executable instructions cause the processor to operate as follows. At first, the processor generates RACH steering information for the set of network slices. The RACH steering information comprises an indication for a User Equipment (UE) to select one of at least one available RACH configuration with a RACH configuration-specific probability. Each of the at least one available RACH configuration comprises at least one of a network slice-specific RACH resource, a network slice-specific back-up RACH resource and a common RACH resource. Then, the processor causes the transceiver to transmit the RACH steering information to the UE. By using such RACH steering information, it is possible to dynamically adjust a RACH load among multiple network slice-specific RACH configurations and common RACH configurations, thereby efficiently balancing the RACH load (i.e., RACH utilization rate) across the set of network slices.

In one example embodiment of the first aspect, each of the at least one available RACH configuration causes the UE to:

- share, at least partly, the network slice-specific RACH resource of at least one network slice of the set of network slices with at least one other network slice of the set of network slices; and/or
- share, at least partly, the network slice-specific back-up RACH resource of at least one network slice of the set of network slices with at least one other network slice of the set of network slices; and/or
- use, at least partly, the common RACH resource for at least one network slice of the set of network slice when a RACH fallback procedure is initiated for the at least one network slice.

By using such RACH configuration(s), it is possible to adjust the RACH load more efficiently. Moreover, such RACH configuration(s) may provide an optimal fallback framework, particularly for the two-step network slice-specific and four-step network slice-specific RACH procedures introduced in 3GPP Rel-17.

In one example embodiment of the first aspect, the network slice-specific RACH resource, the network slice-specific back-up RACH resource and the common RACH resource of each of the at least one RACH configuration correspond to a two-step or four-step RACH procedure. Thus, the RACH steering information may be efficiently (in terms of time costs and complexity) used for the two-step or four-step RACH procedure and associated fallback mechanisms.

In one example embodiment of the second aspect, the processor is configured to transmit the RACH steering information to the UE via at least one of broadcast signaling and a dedicated signaling. By so doing, the RAN node may select decide between a common (broadcast) signaling approach, a UE-specific (dedicated) signaling approach, and their combination, if required and depending on particular applications.

In one example embodiment of the second aspect, the processor is further configured to encode the RACH steering information into a set of Unified Access Control (UAC) parameters and transmit the set of UAC parameters to the UE via the broadcast signaling. Thus, the existing UAC framework may be used to provide the UE with the RACH steering information.

According to a second aspect, a network management entity in a wireless communication network supporting a set of network slices is provided. The network management entity comprises a processor and a memory coupled to the processor and storing processor-executable instructions. When executed, the processor-executable instructions cause the processor to operate as follows. At first, the processor generates at least one network slice-specific RACH policy or at least one network slice-specific resource sharing quota for the set of network slices. The at least one network slice-specific RACH policy or the at least one network slice-specific resource sharing quota assists a RAN node in generating RACH steering information for a UE. In turn, the RACH steering information comprises an indication for the UE to select one of at least one available RACH configuration with a RACH configuration-specific probability. Each of the at least one available RACH configuration comprises at least one of a network slice-specific RACH resource, a network slice-specific back-up RACH resource and a common RACH resource. After that, the processor provides the at least one network slice-specific RACH policy or the at least one network slice-specific resource sharing quota to the RAN node. By using such a network slice-specific RACH policy or such a network slice-specific resource sharing quota, it is possible to generate relevant RACH steering information which may be then used to dynamically adjust the RACH load among multiple network slice-specific RACH configurations and common RACH configurations, thereby efficiently balancing the RACH load across the set of network slices.

In one example embodiment of the second aspect, the network slice-specific RACH resource, the network slice-specific back-up RACH resource and the common RACH resource of each of the at least one available RACH configuration correspond to a two-step or four-step RACH procedure. Thus, the network slice-specific RACH policy or the network slice-specific resource sharing quota may be efficiently (in terms of time costs and complexity) used for the two-step or four-step RACH procedure and associated fallback mechanisms.

In one example embodiment of the second aspect, the processor is further configured to receive a UE report from the RAN node. The UE report is generated by the UE and comprises an indication of a RACH configuration selected by the UE among the at least one available RACH configuration based on the RACH steering information. The UE report further comprises an execution duration of the RACH procedure based on the selected RACH configuration, as well as an indication of whether the UE has experienced a RACH configuration-related collision during the RACH procedure. In this embodiment, the processor is further configured to use the UE report to decide whether to modify the at least one network slice-specific RACH policy or the at least one network slice-specific resource sharing quota. By using such a UE report, it is possible to properly optimize the network slice-specific RACH policy (policies) or the network slice-specific RACH quota(s) to improve network slice-specific RACH performance.

According to a third aspect, a UE in a wireless communication network supporting a set of network slices is provided. The UE comprises a transceiver, a processor coupled to the transceiver, and a memory coupled to the processor and storing processor-executable instructions. When executed, the processor-executable instructions cause the processor to operate as follows. At first, the processor causes the transceiver to receive RACH steering information for the set of network slices from a RAN node. The RACH steering information comprises an indication for the UE to select one of at least one available RACH configuration with a RACH configuration-specific probability. Each of the at least one available RACH configuration comprises at least one of a network slice-specific RACH resource, a network slice-specific back-up RACH resource and a common RACH resource. Next, when the processor receives, by using the transceiver, a network slice-specific scheduling request for a network slice of the set of network slices, the processor selects, from the at least one available RACH configuration, a RACH configuration corresponding to the network slice based on the RACH steering information. Further, by using the network slice-specific scheduling request and the selected RACH configuration, the processor executes a RACH procedure for the network slice. By so doing, it is possible to dynamically adjust the RACH load among multiple network slice-specific RACH configurations and common RACH configurations, thereby efficiently balancing the RACH load across the set of network slices.

In one example embodiment of the third aspect, each of the at least one available RACH configuration causes the UE to:

- share, at least partly, the network slice-specific RACH resource of at least one network slice of the set of network slices with at least one other network slice of the set of network slices; and/or
- share, at least partly, the network slice-specific back-up RACH resource of at least one network slice of the set of network slices with at least one other network slice of the set of network slices; and/or
- use, at least partly, the common RACH resource for at least one network slice of the set of network slices when a RACH fallback procedure is initiated for the at least one network slice.

By using such RACH configuration(s), it is possible to adjust the RACH load more efficiently. Moreover, such RACH configuration(s) may provide an optimal fallback framework, particularly for the two-step network slice-specific and four-step network slice-specific RACH procedures introduced in 3GPP Rel-17.

In one example embodiment of the third aspect, the RACH procedure is a two-step or four-step RACH procedure. In this embodiment, the network slice-specific RACH resource, the network slice-specific back-up RACH resource and the common RACH resource of each of the at least one available RACH configuration correspond to the two-step or four-step RACH procedure. Thus, the RACH steering information may be efficiently (in terms of time costs and complexity) used for the two-step or four-step RACH procedure and associated fallback mechanisms.

In one example embodiment of the third aspect, the processor is configured to receive the RACH steering information via at least one of a broadcast signaling and a dedicated signaling from the RAN node. By using these types of signaling, the UE may be properly provided with the RACH steering information.

In one example embodiment of the third aspect, the RACH steering information is encoded into a set of UAC parameters. In this embodiment, the processor is configured to receive the set of UAC parameters via the broadcast signaling from the RAN node. Thus, the existing UAC framework may be used to provide the UE with the RACH steering information.

In one example embodiment of the third aspect, the processor is further configured to generate a UE report after the RACH procedure is executed by using the selected RACH configuration. The UE report comprises an indication of the selected RACH configuration, an execution duration of the RACH procedure based on the selected RACH configuration, as well as an indication of whether the UE has experienced a RACH configuration-related collision during the RACH procedure. Once the UE report is generated, the processor causes the transceiver to transmit the UE report to the RAN node. The RAN node may then either use the UE report by itself or forward it to the network management entity for its analysis. Thus, the UE report may be eventually used to optimize the RACH steering information.

In one example embodiment of the third aspect, the processor is configured to select the RACH configuration corresponding to the network slice by using a random number generator in accordance with the RACH steering information.

According to a fourth aspect, a method for operating a RAN node in a wireless communication network supporting a set of network slices is provided. The method starts with the step of generating RACH steering information for the set of network slices. The RACH steering information comprises an indication for a UE to select one of at least one available RACH configuration with a RACH configuration-specific probability. Each of the at least one available RACH configuration comprises at least one of a network slice-specific RACH resource, a network slice-specific back-up RACH resource and a common RACH resource. Then, the method proceeds to the step of transmitting the RACH steering information to the UE. By so doing, it is possible to dynamically adjust the RACH load among multiple network slice-specific RACH configurations and common RACH configurations, thereby efficiently balancing the RACH load across the set of network slices.

According to a fifth aspect, a method for operating a network management entity in a wireless communication network supporting a set of network slices is provided. The method starts with the step of generating at least one network slice-specific RACH policy or at least one network slice-specific resource sharing quota for the set of network slices. The at least one network slice-specific RACH policy or the at least one network slice-specific resource quota assists a Radio Access Network (RAN) node in generating RACH steering information for a UE. The RACH steering information comprises an indication for the UE to select one of at least one available RACH configuration with a RACH configuration-specific probability. Each of the at least one available RACH configuration comprises at least one of a network slice-specific RACH resource, a network slice-specific back-up RACH resource and a common RACH resource. Then, the method proceeds to the step of providing the at least one network slice-specific RACH policy or the at least one network slice-specific resource quota to the RAN node. By using such a network slice-specific RACH policy or such a network slice-specific resource sharing quota, it is possible to generate relevant RACH steering information which may be then used to dynamically adjust the RACH load among multiple network slice-specific RACH configurations and common RACH configurations, thereby efficiently balancing the RACH load across the set of network slices.

According to a sixth aspect, a method for operating a UE in a wireless communication network supporting a set of network slices is provided. The method starts with the step of receiving RACH steering information for the set of network slices from a RAN node. The RACH steering information comprises an indication for the UE to select one of at least one available RACH configuration with a RACH configuration-specific probability. Each of the at least one available RACH configuration comprises at least one of a network slice-specific RACH resource, a network slice-specific back-up RACH resource and a common RACH resource. After that, the method goes on to the step of receiving a network slice-specific scheduling request for a network slice of the set of network slices. Next, the method proceeds to the step of selecting, from the at least one available RACH configuration, a RACH configuration corresponding to the network slice based on the RACH steering information. The method ends up with the step of executing a RACH procedure for the network slice based on the network slice-specific scheduling request and the selected RACH configuration. By using such RACH steering information, it is possible to dynamically adjust the RACH load among multiple network slice-specific RACH configurations and common RACH configurations, thereby efficiently balancing the RACH load across the set of network slices.

According to a seventh aspect, a computer program product is provided. The computer program product comprises a computer-readable storage medium that stores a computer code. Being executed by at least one processor, the computer code causes the at least one processor to perform the method according to the fourth aspect. By using such a computer program product, it is possible to simplify the implementation of the method according to the fourth aspect in any network node, like the network node according to the first aspect.

According to an eighth aspect, a computer program product is provided. The computer program product comprises a computer-readable storage medium that stores a computer code. Being executed by at least one processor, the computer code causes the at least one processor to perform the method according to the fifth aspect. By using such a computer program product, it is possible to simplify the implementation of the method according to the fifth aspect in any network management entity, like the network management entity according to the second aspect.

According to a ninth aspect, a computer program product is provided. The computer program product comprises a computer-readable storage medium that stores a computer code. Being executed by at least one processor, the computer code causes the at least one processor to perform the method according to the sixth aspect. By using such a computer program product, it is possible to simplify the implementation of the method according to the sixth aspect in any UE, like the UE according to the third aspect.

According to a tenth aspect, a network node in a wireless communication network supporting a set of network slices is provided. The network node comprises a means for generating RACH steering information for the set of network slices. The RACH steering information comprises an indication for a UE to select one of at least one available RACH configuration with a RACH configuration-specific probability. Each of the at least one available RACH configuration comprises at least one of a network slice-specific RACH resource, a network slice-specific back-up RACH resource and a common RACH resource. The network node further comprises a means for transmitting the RACH steering information to the UE. By using such RACH steering information, it is possible to dynamically adjust the RACH load among multiple network slice-specific RACH configurations and common RACH configurations, thereby efficiently balancing the RACH load across the set of network slices.

According to an eleventh aspect, a network management entity in a wireless communication network supporting a set of network slices is provided. The network management entity comprises a means for generating at least one network slice-specific RACH policy or at least one network slice-specific resource sharing quota for the set of network slices. The at least one network slice-specific RACH policy or the at least one network slice-specific resource sharing quota assists a RAN node in generating RACH steering information for a UE. In turn, the RACH steering information comprises an indication for the UE to select one of at least one available RACH configuration with a RACH configuration-specific probability. Each of the at least one available RACH configuration comprises at least one of a network slice-specific RACH resource, a network slice-specific back-up RACH resource and a common RACH resource. The network management entity further comprises a means for providing the at least one network slice-specific RACH policy or the at least one network slice-specific resource sharing quota to the RAN node. By using such a network slice-specific RACH policy or such a network slice-specific resource sharing quota, it is possible to generate relevant RACH steering information which may be then used to dynamically adjust the RACH load among multiple network slice-specific RACH configurations and common RACH configurations, thereby efficiently balancing the RACH load across the set of network slices.

According to a twelfth aspect, a UE in a wireless communication network supporting a set of network slices is provided. The UE comprises a first means for receiving RACH steering information for the set of network slices from a RAN node. The RACH steering information comprises an indication for the UE to select one of at least one available RACH configuration with a RACH configuration-specific probability. Each of the at least one available RACH configuration comprises at least one of a network slice-specific RACH resource, a network slice-specific back-up RACH resource and a common RACH resource. The UE further comprises a means for storing the RACH steering information. The UE further comprises a second means for receiving a network slice-specific scheduling request for a network slice of the set of network slices. The UE further comprises a means for selecting, from the at least one available RACH configuration, a RACH configuration corresponding to the network slice based on the RACH steering information. The UE further comprises a means for using the network slice-specific scheduling request and the selected RACH configuration to execute a RACH procedure for the network slice. By using such RACH steering information, it is possible to dynamically adjust the RACH load among multiple network slice-specific RACH configurations and common RACH configurations, thereby efficiently balancing the RACH load across the set of network slices.

Other features and advantages of the present disclosure will be apparent upon reading the following detailed description and reviewing the accompanying drawings.

BRIEF DESCRIPTION OF THE DRAWINGS

The present disclosure is explained below with reference to the accompanying drawings in which.

DETAILED DESCRIPTION

Figure 1:
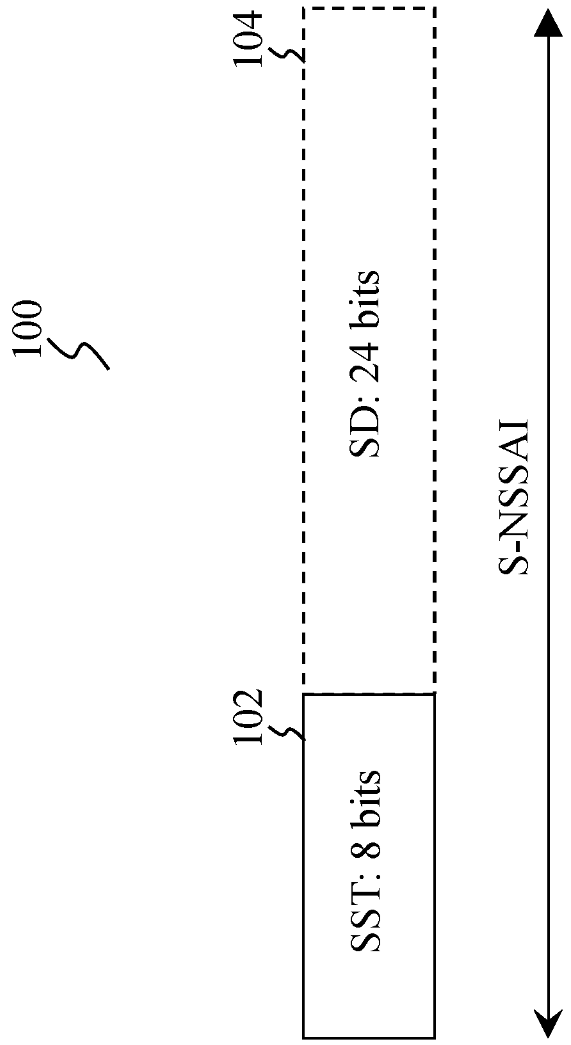
FIG. 1 schematically shows a structure of typical Single-Network Slice Selection Assistance Information (S-NSSAI) in accordance with the prior art.

Various embodiments of the present disclosure are further described in more detail with reference to the accompanying drawings. However, the present disclosure can be embodied in many other forms and should not be construed as limited to any certain structure or function discussed in the following description. In contrast, these embodiments are provided to make the description of the present disclosure detailed and complete.

According to the detailed description, it will be apparent to the ones skilled in the art that the scope of the present disclosure encompasses any embodiment thereof, which is disclosed herein, irrespective of whether this embodiment is implemented independently or in concert with any other embodiment of the present disclosure. For example, the apparatuses and methods disclosed herein can be implemented in practice by using any numbers of the embodiments provided herein. Furthermore, it should be understood that any embodiment of the present disclosure can be implemented using one or more of the elements presented in the appended claims.

Unless otherwise stated, any embodiment recited herein as "example embodiment" should not be construed as preferable or having an advantage over other embodiments.

According to the example embodiments disclosed herein, a User Equipment (UE) may refer to an electronic computing device that is configured to perform wireless communications.

The UE may be implemented as a mobile station, a mobile terminal, a mobile subscriber unit, a mobile phone, a cellular phone, a smart phone, a cordless phone, a personal digital assistant (PDA), a wireless communication device, a desktop computer, a laptop computer, a tablet computer, a gaming device, a netbook, a smartbook, an ultrabook, a medical mobile device or equipment, a biometric sensor, a wearable device (e.g., a smart watch, smart glasses, a smart wrist band, etc.), an entertainment device (e.g., an audio player, a video player, etc.), a vehicular component or sensor (e.g., a driver-assistance system), a smart meter/sensor, an unmanned vehicle (e.g., an industrial robot, a quadcopter, etc.) and its component (e.g., a self-driving car computer), industrial manufacturing equipment, a global positioning system (GPS) device, an Internet-of-Things (IoT) device, an Industrial IoT (IIoT) device, a machine-type communication (MTC) device, a group of Massive IoT (MIoT) or Massive MTC (mMTC) devices/sensors, or any other suitable mobile device configured to support wireless communications. In some embodiments, the mobile UE may refer to at least two collocated and inter-connected UEs thus defined.

As used in the example embodiments disclosed herein, a Radio Access Network (RAN) node may relate to a fixed point of communication for the mobile UE in a particular wireless communication network. The RAN node is used to connect the UE to a Data Network (DN) through a Core Network (CN) and may be referred to as a base transceiver station (BTS) in terms of the 2G communication technology, a NodeB in terms of the 3G communication technology, an evolved NodeB (eNodeB) in terms of the 4G communication technology, and a gNB in terms of the 5G New Radio (NR) communication technology. The RAN node may serve different cells, such as a macrocell, a microcell, a picocell, a femtocell, and/or other types of cells. The macrocell may cover a relatively large geographic area (for example, at least several kilometers in radius). The microcell may cover a geographic area less than two kilometers in radius, for example. The picocell may cover a relatively small geographic area, such, for example, as offices, shopping malls, train stations, stock exchanges, etc. The femtocell may cover an even smaller geographic area (for example, a home). Correspondingly, the network node serving the macrocell may be referred to as a macro node, the network node serving the microcell may be referred to as a micro node, and so on.

According to the example embodiments disclosed herein, a wireless communication network, in which the mobile UE and the network node communicate with each other, may refer to a cellular or mobile network, a Wireless Local Area Network (WLAN), a Wireless Personal Area Networks (WPAN), a Wireless Wide Area Network (WWAN), a satellite communication (SATCOM) system, or any other type of wireless communication networks. Each of these types of wireless communication networks supports wireless communications according to one or more communication protocol standards. For example, the cellular network may operate according to the Global System for Mobile Communications (GSM) standard, the Code-Division Multiple Access (CDMA) standard, the Wide-Band Code-Division Multiple Access (WCDM) standard, the Time-Division Multiple Access (TDMA) standard, or any other communication protocol standard, the WLAN may operate according to one or more versions of the IEEE 802.11 standards, the WPAN may operate according to the Infrared Data Association (IrDA), Wireless USB, Bluetooth, or ZigBee standard, and the WWAN may operate according to the Worldwide Interoperability for Microwave Access (WiMAX) standard.

As used in the example embodiments disclosed herein, network slicing may be considered as a key 5G feature to support different services using the same underlying mobile network infrastructure. Network slices may differ either in their service requirements like URLLC and eMBB, or the tenant that provides those services. Each network slice is uniquely identified via Single-Network Slice Selection Assistance Information (S-NSSAI). Current 3GPP specifications allow a mobile UE to be simultaneously connected and served by at most eight S-NSSAIs. On other hand, each cell may support tens or even hundreds of S-NSSAIs, e.g., in the current 3GPP specifications a tracking area may have a support up to 1024 network slices.

FIG. 1 schematically shows a structure 100 of typical S-NSSAI in accordance with the prior art. The structure 100 of the typical S-NSSAI comprises both a Slice Service Type (SST) field 102 and a Slice Differentiator (SD) field 104 with a total length of 32 bits. It should be noted that the structure 100 of the typical S-NSSAI may include only the SST field 102, in which case the length of the S-NSSAI is 8 bits only. The SST field 102 may have standardized and non-standardized values. Values from 0 to 127 belong to a standardized SST range. For example, the SST value of 1 may indicate that a desired network slice is suitable for handling 5G eMBB services, the SST value of 2 may indicate that the desired network slice is suitable for handling URLLC services, etc. The SD field 104 is operator-defined only.

It should be noted that 3GPP TR 28.801 describes three functional entities for managing one or more network slices or network slice instances (NSIs) to support communication application or services. These functional entities include a Communication Service Management Function (CSMF), a Network Slice Management Function (NSMF), and a Network Slice Subnet Management Function (NSSMF). The CSMF is responsible for translating a communication service-related requirement to network slice-related requirements. The NSMF is responsible for management and orchestration of NSIs and derives network slice subnet-related requirements from the network slice-related requirements. The NSSMF is responsible for the management and orchestration of Network slice subnet instances (NSSIs). Each of these three functional entities may be analogous to a virtual machine (VM) running on sliced resources provided by a supervisor. In other words, each of these three functional entities provides a management interface for the sliced resources, in a manner analogous to an operating system (virtualized to as a VM) which provides access to sliced computing resources.

As used in the embodiments disclosed herein, a Random Access Channel (RACH) may refer to a channel that may be shared by multiple UEs and may be used by the UEs to access one or more network slices for communications. Correspondingly, a RACH procedure may refer to a procedure for establishing such a channel. For example, the RACH may be used for call setup and to access the network slice(s) for data transmissions. The RACH procedure may be used for initial access to a certain network slice when a UE switches from a Radio Resource Control (RRC) idle mode to an RRC connected mode, or when performing handover to a target cell in the RRC connected mode. Moreover, the RACH procedure may be used for downlink (DL) and/or uplink (UL) data arrival when the UE is in the RRC idle or RRC inactive modes.

As follows from 3GPP Rel-17, different RACH resources and RACH configurations could be configured for different network slices, including two-step and four-step network slice-specific RACH procedures and associated fallback mechanisms. To minimize the complexity of the overall network slice-specific RACH configuration, it is necessary to configure the RACH resources and the fallback mechanisms by considering their impact on available signaling resources and the complexity of the RACH procedure.

The reason for introducing a fallback mechanism for switching from a two-step RACH procedure to a four-step RACH procedure is that there is a fundamental difference between the two procedures. There are two main reasons to define such a fallback mechanism:

1) A possible lack of random access response (valid reason to initiate only for the two-step RACH to four-step RACH fallback mechanism);
2) A two-step RACH procedure load (valid reason to initiate any RACH fallback mechanism).

Differently to the two-step RACH procedure, the four-step RACH procedure has an extra message that goes from a RAN node to a UE and is called a Random Access Response (RAR). The RAR provides Timing Advance (TA) and Transmit Power Control (TPC) information to the UE. The first technical reasoning for this fallback would be the lack of this corrective feedback and as such, if the UE is not successful with the two-step RACH procedure, it can switch to the four-step RACH procedure and can acquire the RAR to adjust the TA and the TPC accordingly. The second technical reasoning is that random access is a blind procedure for the whole network. UEs access the RACH without prior knowledge of the network on access intentions. This means that network can never know deterministically what the RACH load at a certain time instance will be. A high RACH load (or, in other words, RACH utilization rate) may mean that UEs cause uplink interference to each other, thereby leading to a RACH failure.

Given the above, there is a critical need for defining an optimal fallback framework, particularly for the two-step and four-step network slice-specific RACH procedures introduced in 3GPP Rel-17. Such an optimal fallback mechanism needs to minimize RACH resource fragmentation and reduce the overall procedure complexity. However, it is currently unclear how fallback mechanisms will be introduced for the RACH procedures with the network slicing.

Figure 2:
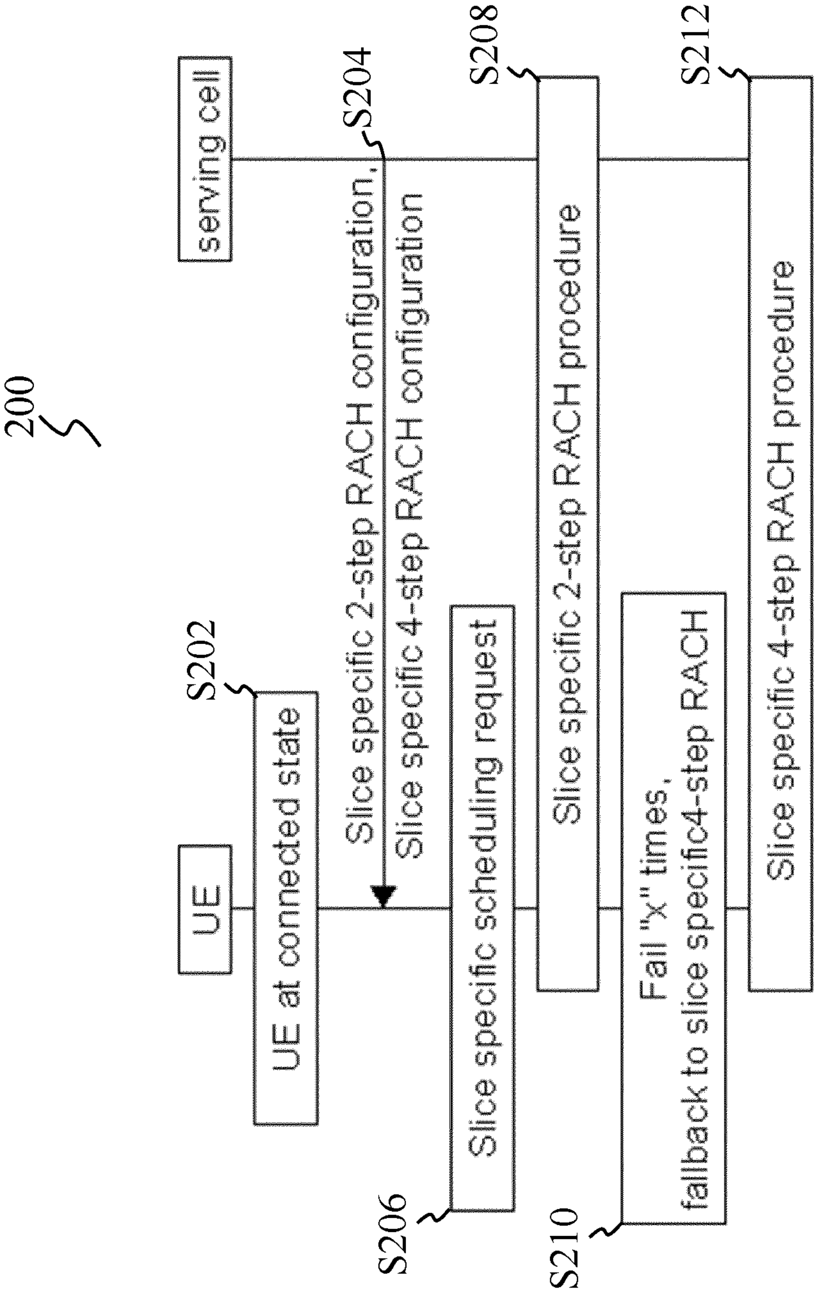
FIG. 2 shows an interaction diagram that explains an existing fallback mechanism for switching from a two-step network slice-specific Random Access Channel (RACH) procedure to a four-step network slice-specific RACH procedure.

FIG. 2 shows an interaction diagram 200 that explains an existing fallback mechanism for switching from the two-step network slice-specific RACH procedure to the four-step network slice-specific RACH procedure. The interaction diagram 200 starts with a step S202, in which a UE moves to a connected state (e.g., the RRC connected state). Then, a next step S204 is initiated, in which the UE receives a two-step network slice-specific RACH configuration and a four-step network slice-specific RACH configuration from a serving cell or, in other words, from a RAN node controlling the serving cell. After that, the interaction diagram 200 goes on to a step S206, in which it is assumed that the UE receives a network slice-specific scheduling request (e.g., a mobile originated (MO) traffic). In response to the network slice-specific scheduling request, the UE decides to execute the two-step network slice-specific RACH procedure in a next step S208. Further, the interaction diagram 200 proceeds to a step S210, in which it is assumed that the UE observes a failure during the execution of the two-step network slice-specific RACH procedure. If the UE fails to finish the RACH procedure a certain number of times, the UE decides to fall back or switch from the two-step network slice-specific RACH procedure to the four-step network slice-specific RACH procedure in a next step S212. However, if the UE also observes a failure during the execution of the four-step network slice-specific RACH procedure, it should keep on trying as with the normal four-step RACH procedure. This provides the UE no solution except waiting in case there is a high load in a four-step network slice-specific RACH.

Figure 3:
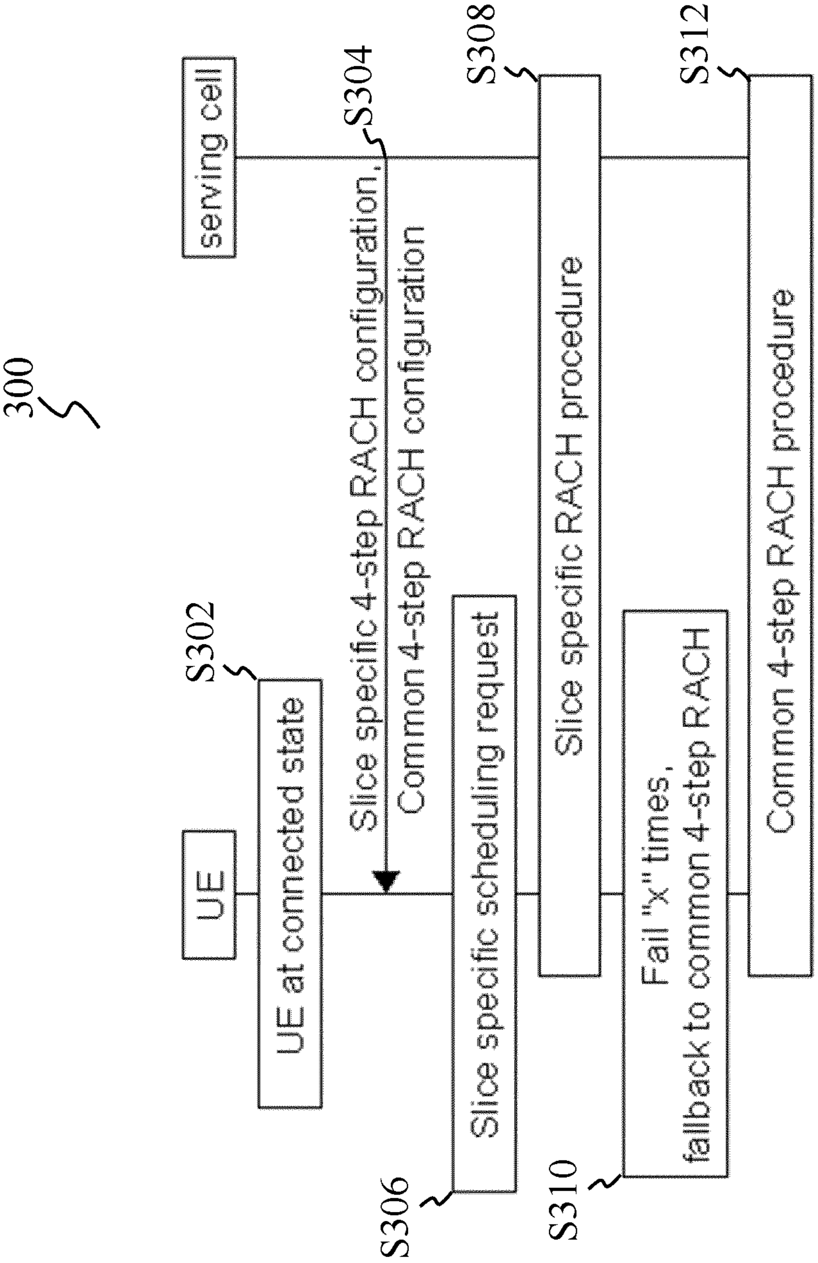
FIG. 3 shows an interaction diagram that explains an existing fallback mechanism for switching from the four-step network slice-specific RACH procedure to a four-step common RACH procedure.

FIG. 3 shows an interaction diagram 300 that explains an existing fallback mechanism for switching from a four-step network slice-specific RACH procedure to a common four-step RACH procedure. The interaction diagram 300 starts with a step S302, in which a UE moves to a connected state (e.g., the RRC connected state). Then, a next step S304 is initiated, in which the UE receives a four-step network slice-specific RACH configuration and a common four-step RACH configuration from a serving cell or, in other words, from a RAN node controlling the serving cell. After that, the interaction diagram 300 goes on to a step S306, in which it is assumed that the UE receives a network slice-specific scheduling request (e.g., a MO traffic). In response to the network slice-specific scheduling request, the UE decides to execute the four-step network slice-specific RACH procedure in a next step S308. Further, the interaction diagram 300 proceeds to a step S310, in which it is assumed that the UE observes a failure during the execution of the four-step network slice-specific RACH procedure. If the UE fails to finish the RACH procedure a certain number of times, the UE decides to fall back or switch from the four-step network slice-specific RACH procedure to the common four-step RACH procedure in a next step S312. However, if the UE also fails with the common four-step RACH procedure, it should keep trying to execute this RACH procedure. There is no guarantee that a common four-step RACH will be less loaded then a four-step network slice-specific RACH. Thus, it is not sure if such a fallback mechanism is helpful at all. It may be even counterproductive.

As an alternative, the RAN node may configure new parameters to flexibly control whether to support the fallback from the network slice-specific RACH procedure to the common RACH procedure. For example, if the new parameters used for the fallback from the two-step network slice-specific RACH procedure to the four-step common RACH procedure is set to infinite, it implicitly indicates that this fallback mechanism is not supported. In this case, the UE has to try the two-step network slice-specific RACH procedure and will fail until it falls back to the four-step common RACH procedure. This would cause a delay in all the RACH procedures.

Figure 4:
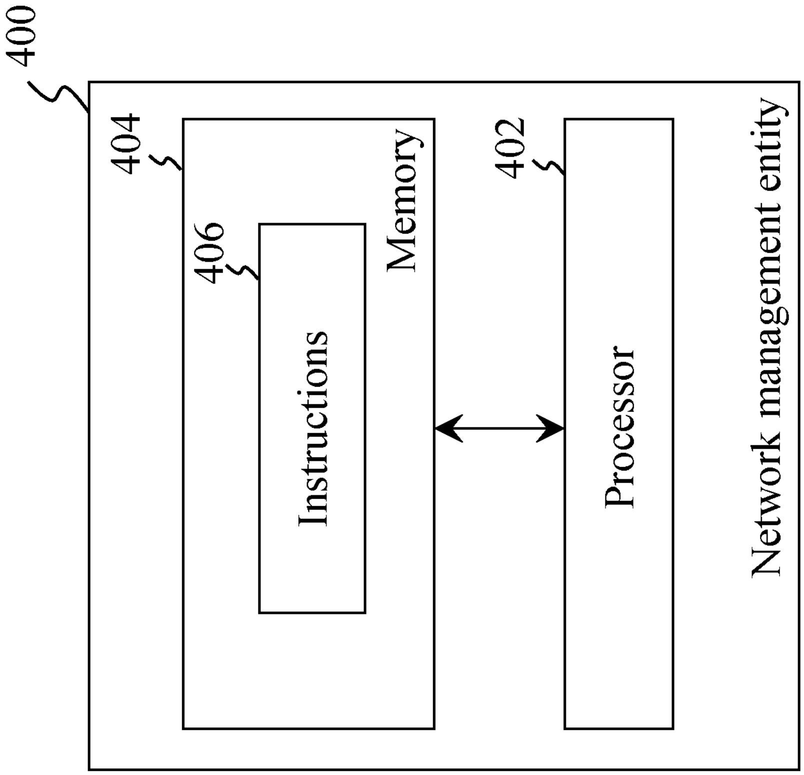
FIG. 4 shows a general block-scheme of a network management entity in accordance with one example embodiment.

The example embodiments disclosed herein provide a technical solution that allows mitigating or even eliminating the above-sounded drawbacks peculiar to the prior art. In particular, the technical solution disclosed herein involves generating, at a RAN node, RACH steering information for a set of network slices supported in a wireless communication network. The RACH steering information comprises an indication for a UE to select one of available RACH configurations with a RACH configuration-specific probability. In one embodiment, the RACH steering information may be defined based on at least one network slice-specific RACH policy or at least one network slice-specific resource sharing quota provided from a network management entity (e.g., an NSMF) to the RAN node. In another embodiment, the RAN node may generate RACH steering information based on available local information about the set of network slices. Once the RACH steering information is generated, the RAN node transmits it to a UE. By using the RACH steering information, it is possible to dynamically adjust a RACH load among multiple network slice-specific RACH configurations and common RACH configurations, thereby efficiently balancing the RACH load (i.e., RACH utilization rate) across the set of network slices FIG. 4 shows a general block-scheme of a network management entity 400 in accordance with one example embodiment. The network management entity 400 is intended to operate in a CN that supports the above-mentioned network slicing. For example, the network management entity 400 may be implemented as an NSMF or CSMF. As shown in FIG. 4, the network management entity 400 comprises a processor 402 and a memory 404 coupled to the processor 402. The memory 404 stores processor-executable instructions 406 which, when executed by the processor 402, cause the processor 402 to implement the aspects of the present disclosure, as will be described below in more detail. It should be noted that the number, arrangement and interconnection of the constructive elements constituting the network management entity 400, which are shown in FIG. 4, are not intended to be any limitation of the present disclosure, but merely used to provide a general idea of how the constructive elements may be implemented within the network management entity 400. For example, the processor 402 may be replaced with several processors, as well as the memory 404 may be replaced with several removable and/or fixed storage devices, depending on particular applications.

The processor 402 may be implemented as a CPU, general-purpose processor, single-purpose processor, microcontroller, microprocessor, application specific integrated circuit (ASIC), field programmable gate array (FPGA), digital signal processor (DSP), complex programmable logic device, etc. It should be also noted that the processor 402 may be implemented as any combination of one or more of the aforesaid. As an example, the processor 402 may be a combination of two or more microprocessors.

The memory 404 may be implemented as a classical nonvolatile or volatile memory used in the modern electronic computing machines. As an example, the nonvolatile memory may include Read-Only Memory (ROM), ferroelectric Random-Access Memory (RAM), Programmable ROM (PROM), Electrically Erasable PROM (EEPROM), solid state drive (SSD), flash memory, magnetic disk storage (such as hard drives and magnetic tapes), optical disc storage (such as CD, DVD and Blu-ray discs), etc. As for the volatile memory, examples thereof include Dynamic RAM, Synchronous DRAM (SDRAM), Double Data Rate SDRAM (DDR SDRAM), Static RAM, etc.

The processor-executable instructions 406 stored in the memory 404 may be configured as a computer-executable code which causes the processor 402 to perform the aspects of the present disclosure. The computer-executable code for carrying out operations or steps for the aspects of the present disclosure may be written in any combination of one or more programming languages, such as Java, C++, or the like. In some examples, the computer-executable code may be in the form of a high-level language or in a pre-compiled form and be generated by an interpreter (also pre-stored in the memory 404) on the fly.

Figure 5:
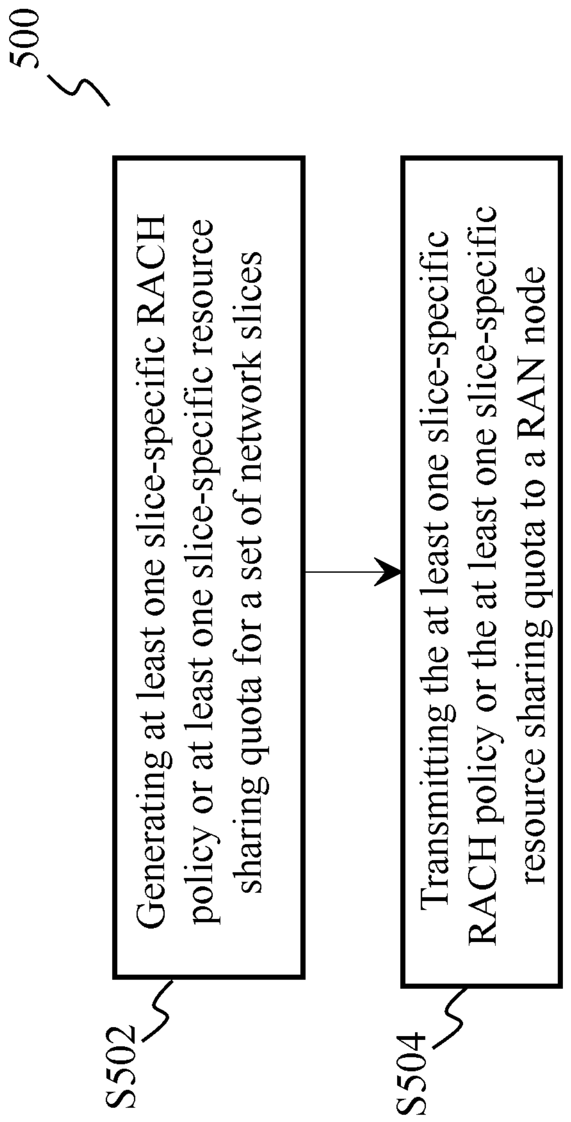
FIG. 5 shows a flowchart of a method for operating the network management entity shown in FIG. 4 in accordance with a first example embodiment.

FIG. 5 shows a flowchart of a method 500 for operating the network management entity 400 in accordance with one example embodiment. The method 500 starts with a step S502, in which the processor 402 generates at least one network slice-specific RACH policy or at least one network slice-specific resource sharing quota for a set of network slices, for example, based on one or more service level agreements applied to the set of network slices (e.g., certain network slices like the ones relating to public safety may have strict isolation requirements).

As for the network slice-specific resource sharing quota, it can be defined in 3GPP TS 28.541 as follows: the network slice-specific resource sharing quota may refer to a percentage of gNB resources that can be allocated to a particular network slice either in a dedicated, prioritized or shared manner. However, this defines the "general" resource allocation for network slices and is not limited to the RACH resources only. At the same time, even if the network slice-specific resource sharing quota is related to the overall network slice-specific resources, a gNB can infer some RACH steering information from such a resource sharing quota. In other words, the network slice-specific resource sharing quota may be still useful for generating the RACH steering information at the gNB.

As for the network slice-specific RACH policy, it may comprise at least one of permissions:

(i) a permission to share, at least partly, a network slice-specific RACH resource of at least one network slice of the set of network slices with at least one other network slice of the set of network slices;

(ii) a permission to share, at least partly, a network slice-specific back-up RACH resource of at least one network slice of the set of network slices with at least one other network slice of the set of network slices; and (iii) a permission to use, at least partly, a common RACH resource for at least one network slice of the set of network slices when a RACH fallback procedure is initiated.

It should be noted that the RACH resources mentioned in the above permissions (i)-(iii) may be related to the two-step and four-step RACH procedures. Ones skilled in the art will understand that the two-step and four-step RACH procedures will be network slice-specific in case of using the network slice-specific RACH resources and common in case of using the common RACH resource.

The permission (i) may specify that one slice or one subset of network slices of the set of network slices may share its network slice-specific RACH resources with another slice or another subset of network slices of the set of network slices. Subsets of network slices may be, for example, determined based on the application or service category they are related to. In one embodiment, the permission (i) may additionally specify that a certain percentage of a first network slice or a first subset of network slices of the set of network slices may use the network slice-specific RACH resource of a second slice or a second subset of network slices of the set of network slices, while another percentage of the first network slice or the first subset of network slices may use the network slice-specific RACH resource of a third slice or a third subset of network slices of the set of network slices.

The permission (ii) may specify that one slice or one subset of network slices of the set of network slices may share its network slice-specific back-up RACH resources with another slice or another subset of network slices of the set of network slices. Each network slice-specific back-up RACH resource may be guaranteed to be empty and only used in case of a fallback procedure. This enables the network to prioritize successful RACH operation, while prioritizing failed UEs. In some embodiments, two or more subsets of network slices may share the same network slice-specific back-up RACH resource. In some other embodiments, such network slice-specific back-up RACH resources may be provided for specific network slices or subsets of network slices (e.g., high-priority slices only), but to guarantee successful operation this has to be limited. Similar to the permission (i), the permission (ii) may additionally specify that one network slice or one subset of network slices of the set of network slices may use a percentage of a certain back-up RACH resource(s).

The permission (iii) may specify that one network slice or one subset of network slices of the set of network slices may use the whole common RACH resource or its part (a certain percentage thereof) to perform the fallback from the (two-step or four-step) network slice-specific RACH procedure to the (two-step or four-step) common RACH procedure.

Once the network slice-specific RACH policy (policies) or the network slice-specific resource sharing quota(s) is(are) defined, the method 500 proceeds to a step S502, in which the processor 402 provides, by using a wired or wireless connection, the network slice-specific RACH policy (policies) or the network slice-specific resource sharing quota(s) to a RAN node.

Figure 6:
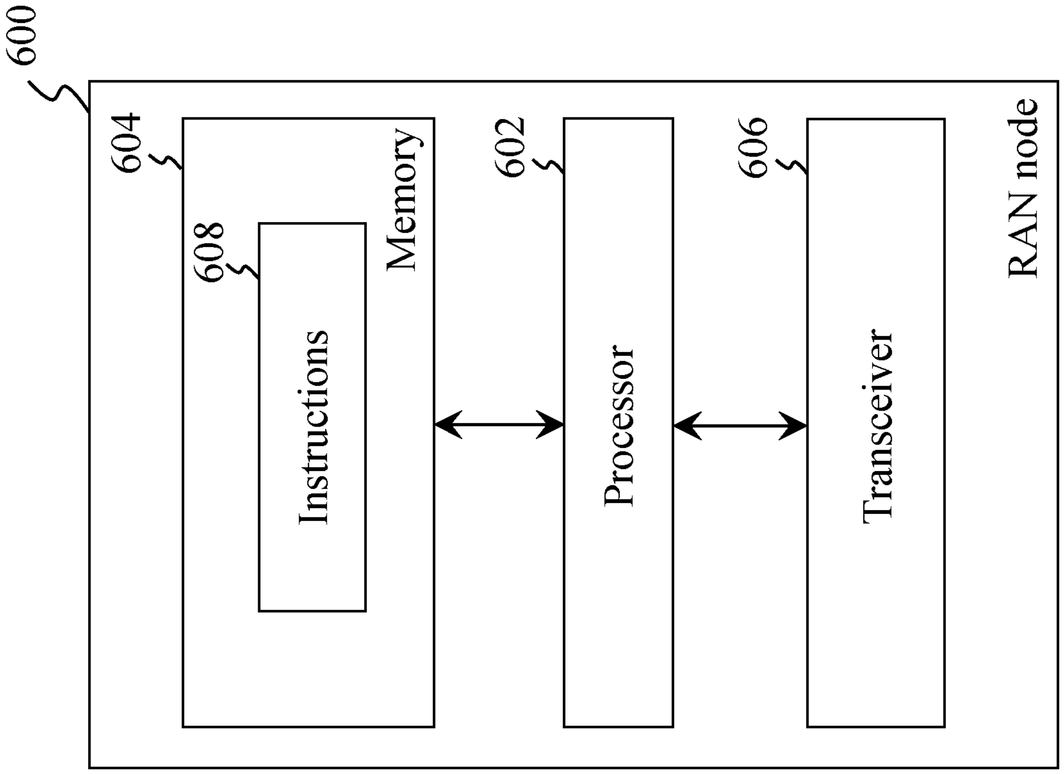
FIG. 6 shows a general block-scheme of a Radio Access Network (RAN) node in accordance with one example embodiment.

FIG. 6 shows a general block-scheme of a RAN node 600 in accordance with one example embodiment. The RAN node 600 may communicate with the network management entity 400, but the RAN node 600 is deployed not in the CN but in any of the above-described wireless communication networks that supports the above-mentioned network slicing. As shown in FIG. 6, the RAN 600 comprises a processor 602, a memory 604, and a transceiver 606. The memory 604 stores processor-executable instructions 608 which, when executed by the processor 602, cause the processor 602 to implement the aspects of the present disclosure, as will be described below in more detail. It should be noted that the number, arrangement and interconnection of the constructive elements constituting the RAN node 600, which are shown in FIG. 6, are not intended to be any limitation of the present disclosure, but merely used to provide a general idea of how the constructive elements may be implemented within the RAN node 600. In general, the processor 602, the memory 604, and the processor-executable instructions 608 may be implemented in the same or similar manner as the processor 402, the memory 404, and the processor-executable instructions 406, respectively, in the network management entity 400. As for the transceiver 406, in some embodiments, it may be implemented as two individual devices, with one for a receiving operation and another for a transmitting operation. Irrespective of its implementation, the transceiver 406 is intended to be capable of performing different operations required to perform the data reception and transmission, such, for example, as signal modulation/demodulation, encoding/decoding, etc.

Figure 7:
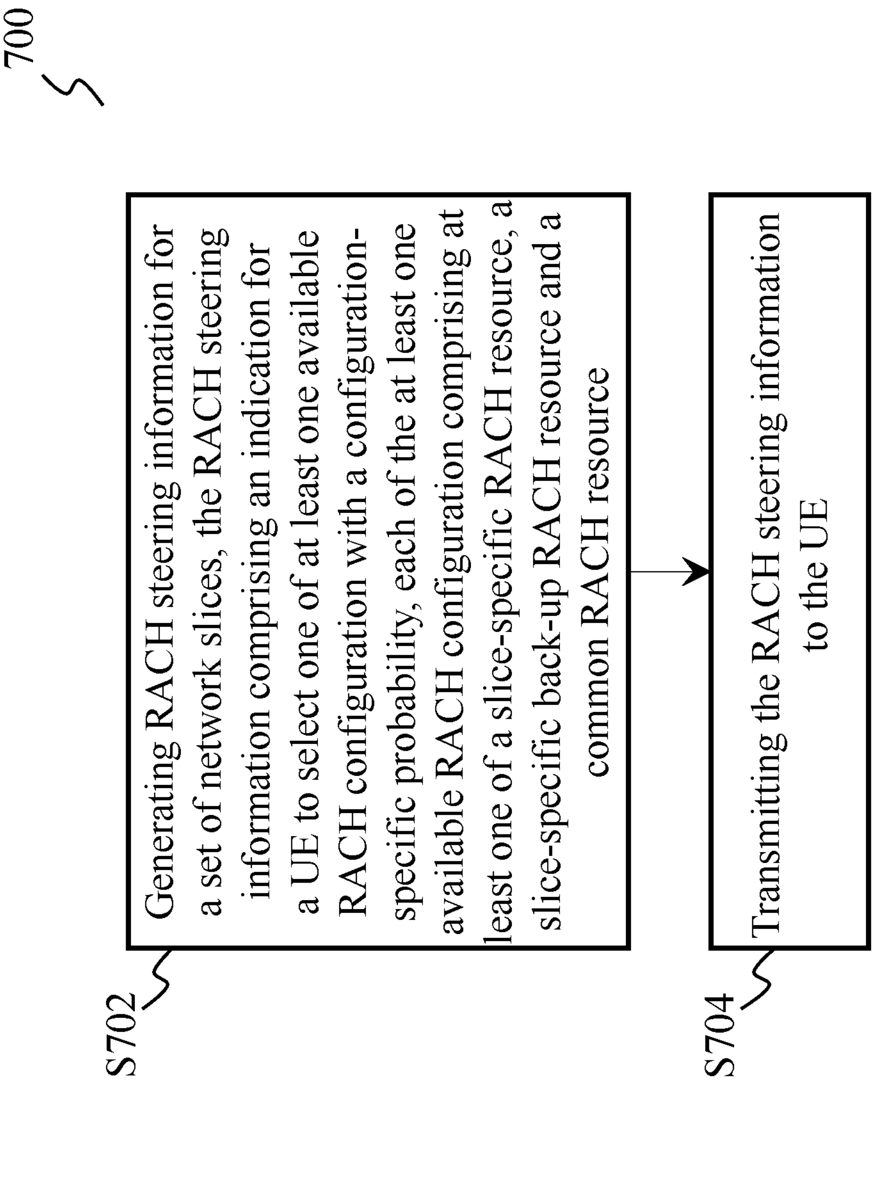
FIG. 7 shows a flowchart of a method for operating the RAN node shown in FIG. 6 in accordance with one example embodiment.

FIG. 7 shows a flowchart of a method 700 for operating the RAN node 600 in accordance with one example embodiment. The method 700 starts with a step S702, in which the processor 602 generates RACH steering information for a set of network slices. The RACH steering information comprises an indication for a UE to select one of at least one available RACH configuration with a RACH configuration-specific probability. Each of the at least one available RACH configuration comprises at least one of a network slice-specific RACH resource, a network slice-specific back-up RACH resource and a common RACH resource. In one embodiment, the processor 602 may generate the RACH steering information based on the network slice-specific RACH policy (policies) or the network slice-specific resource sharing quota(s) provided from the network management entity 400. In another embodiment, the processor 602 may generate the RACH steering information, for example, based on the following locally available information: a load (i.e., utilization rate of) on the network slice-specific RACH resources among the set of network slices, a load on the network slice-specific back-up RACH resources among the set of network slices, a load on the common RACH resource among the set of network slices, an expected traffic load for each network slice of the set of network slices, or any combination thereof.

Each RACH configuration indicates what RACH resources and in what percentage are to be used for each network slice or each subset of network slices. For example, the UE configuration may indicate that a first subset of network slices of the set of network slices should (not "may" because it is an instruction but not a permission used in the network slice-specific RACH policy) use first four-step network slice-specific RACH resource (hereinafter—the four-step network slice-specific RACH resource-1) with a probability of 30%, second four-step network slice-specific RACH resource (hereinafter—the four-step network slice-specific RACH resource-2) with a probability of 60%, and common four-step common RACH resource with a probability of 10%. It should be also noted that these percentages of the available RACH resources may be presented in the RACH configuration as a uniform distribution between 0 and 99, so that the subrange of 0-29 is used for the four-step network slice-specific RACH resource-1, the subrange of 30-89 is used for the four-step network slice-specific RACH resource-2, and the subrange of 90-99 for the four-step common RACH resource. After the RACH steering information is generated, the method 700 goes on to a step S704, in which the processor 602 transmits the RACH steering information to the UE by using the transceiver 606.

In some embodiments, the processor 602 may transmit the RACH steering information to the UE via a dedicated signaling (e.g., by using RRC messages) or a broadcast signaling (e.g., by using System Information Blocks (SIBs)). In one other possible embodiment, the processor 602 may integrate the RACH steering information into the UAC framework used in a SIB 1 (SIB1). Currently there is a parameter for access barring for each access category with the UAC framework, but the access barring is used to simply postpone the access of some UEs. Instead of barring the access, it is possible to introduce a new UAC parameter to steer the UE to different RACH resources.

Figure 8:
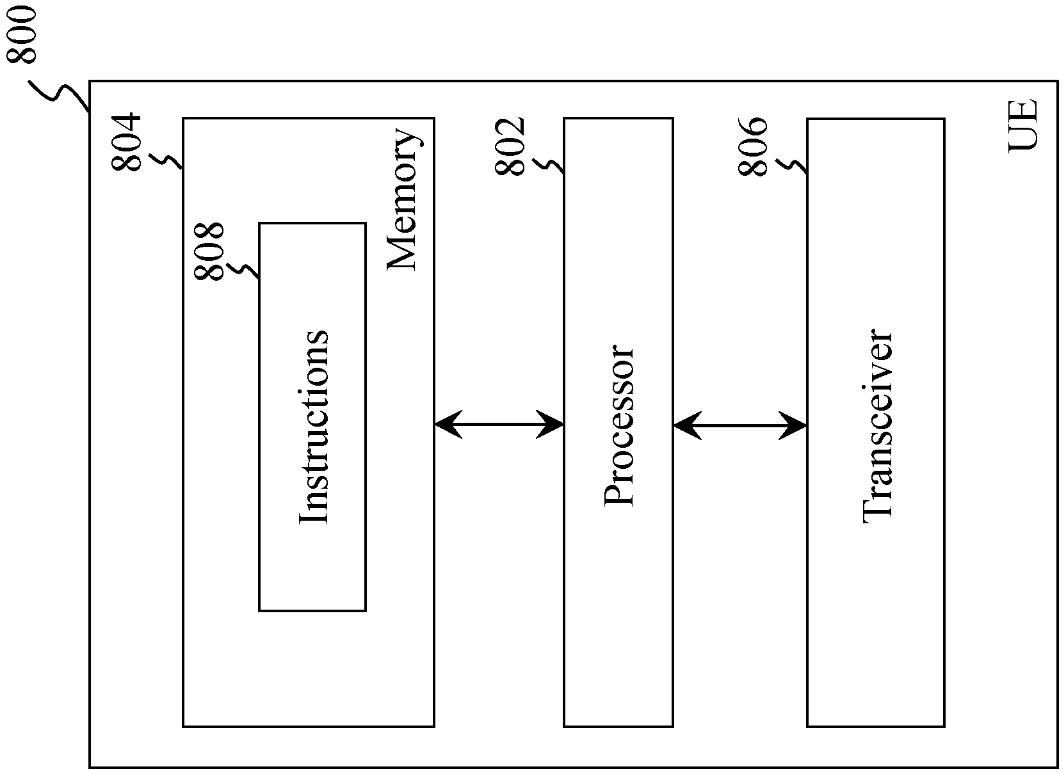
FIG. 8 shows a general block-scheme of a User Equipment (UE) in accordance with one example embodiment.

FIG. 8 shows a general block-scheme of a UE 800 in accordance with one example embodiment. The UE 800 may communicate with the RAN 600 and (indirectly) with the network management entity 400, and the UE 800 is assumed to be in any of the above-described wireless communication networks that supports the above-mentioned network slicing. As shown in FIG. 8, the UE 800 comprises a processor 802, a memory 804, and a transceiver 806. The memory 804 stores processor-executable instructions 808 which, when executed by the processor 802, cause the processor 802 to implement the aspects of the present disclosure, as will be described below in more detail. It should be noted that the number, arrangement and interconnection of the constructive elements constituting the UE 800, which are shown in FIG. 8, are not intended to be any limitation of the present disclosure, but merely used to provide a general idea of how the constructive elements may be implemented within the UE 800. In general, the processor 802, the memory 804, and the processor-executable instructions 808 may be implemented in the same or similar manner as the processor 402, the memory 404, and the processor-executable instructions 406, respectively, in the network management entity 400. As for the transceiver 806, it may be implemented in the same or similar manner as the transceiver 606 in the RAN node 600.

Figure 9:
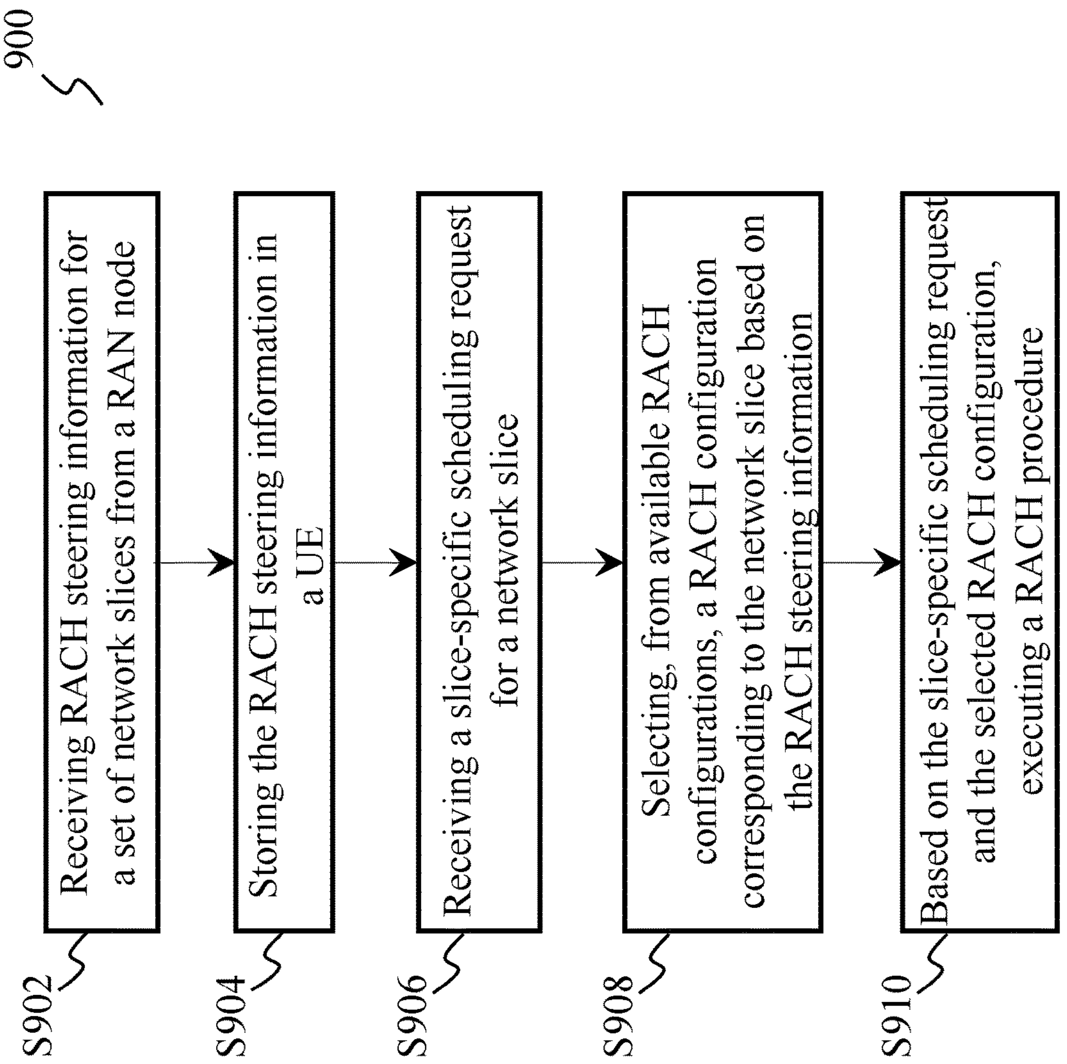
FIG. 9 shows a flowchart of a method for operating the UE shown in FIG. 8 in accordance with one example embodiment.

FIG. 9 shows a flowchart of a method 900 for operating the UE 800 in accordance with one example embodiment. The method 900 starts with a step S902, in which the processor 802 receives, by using the transceiver 806, the RACH steering information for the set of network slices from the RAN node 600. As noted above, the RACH steering information may be received from the RAN node 600 via the broadcast (e.g., UAC parameters) or dedicated (e.g., RRC messages) signaling. Then, the method 900 proceeds to a step S904, in which the processor 802 stores the RACH steering information in the memory 804. After that, the method 900 goes on to a step S906, in which the processor 802 receives, by using the transceiver 806, a network slice-specific scheduling request for a certain network slice of the set of network slices. Further, a next step S908 is initiated, which the processor 802 selects, from the available RACH configurations previously signaled to the UE 900 from the RAN node 600, a RACH configuration corresponding to the network slice based on the RACH steering information. The step S908 may be performed by using a random number generator in accordance with the RACH steering information. Next, the method 900 proceeds to a step S910, in which the processor 802 uses the network slice-specific scheduling request and the selected RACH configuration to execute a RACH procedure for the network slice.

In one embodiment, the method 900 may comprise an additional step after the step S910, in which the processor 802 generates a UE report that comprises: an indication of the selected RACH configuration; an execution duration of the selected RACH procedure; and an indication of whether the UE has experienced a RACH configuration-related collision during the RACH procedure. For example, the RACH configuration-related collision may occur if the processor 800 has not received a message B in time during the two-step RACH procedure, or if the UE has not received a message MSG4 in time during the four-step RACH procedure. When the UE report is generated, the processor 802 may then cause the transceiver 806 to transmit the UE report to the RAN node 600. In one embodiment, the RAN node 600 may either forward the UE report to the network management entity 400 for further analysis. By using such a UE report, the network management entity 400 may collect management data analytics, so that it can determine whether it is required to optimize the network slice-specific RACH policy (policies) or the network slice-specific resource sharing quota(s) and, consequently, the RACH steering information to improve network slice-specific RACH performance. In another embodiment, the RAN node 600 may analyze the UE report by itself to decide whether a change to the RACH steering information is required.

Figure 10:
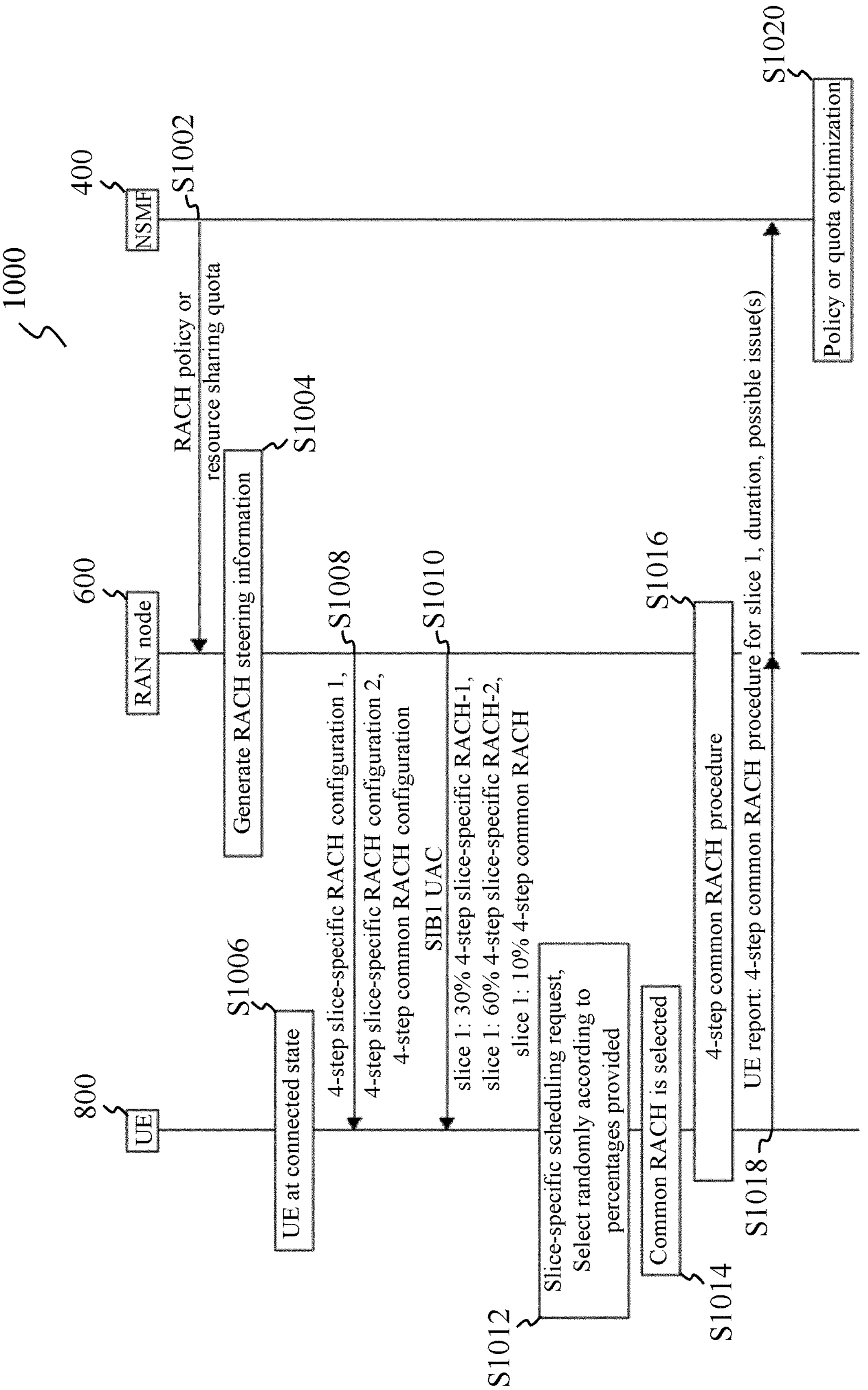
FIG. 10 shows an interaction diagram that explains the interaction between the network management entity shown in FIG. 4, the RAN node shown in FIG. 600, and the UE shown in FIG. 8 in accordance with one example embodiment.

FIG. 10 shows an interaction diagram 1000 that explains the interaction between the network management entity 400 (implemented as an NSMF), the RAN node 600, and the UE 800 in accordance with one example embodiment. The interaction diagram 1000 starts with a step S1002, in which the NSMF 400 generates the network slice-specific RACH policy or the network slice-specific resource sharing quota in accordance with the method 500 and transmits the network slice-specific RACH policy or the network slice-specific resource sharing quota to the RAN node 600. Next, in a step S1004, the RAN node 600 generates the RACH steering information for the UE 800 based on the received network slice-specific RACH policy or network slice-specific resource sharing quota in accordance with the method 700. In the embodiment shown in FIG. 10, it is assumed that the RAN node 600 prepares a four-step network slice-specific RACH configuration for slice 1 (hereinafter—four-step slice-specific RACH configuration 1), a four-step network slice-specific RACH configuration for slice 2 (hereinafter—four-step slice-specific RACH configuration 2), and a four-step common RACH configuration. Each of these RACH configurations indicates the RACH resources and RACH parameters to be used by the UE 800. The RAN node 600 may inform the UE 800 about the RACH configurations in a next step S1008. At the same time, the RACH steering information itself is assumed to be integrated into SIB1 UAC parameters which are then transmitted to the UE 800 in a next step S1010. As shown in FIG. 10, the RACH steering information indicates that the UE 800 should use, for network slice 1, own RACH resource with a probability of 30%(30% RACH-1), RACH resource of slice 2 with a probability of 60% (60% RACH-2), and common RACH resource with a probability of 10%(10% common RACH). In other words, for network slice 1, the UE 800 should use RACH-1 30% of its time, RACH-2 60% of its time, and the common RACH 10% of its time. After that, the interaction diagram 1000 proceeds to a step S1012, in which the UE 800 is assumed to receive a network slice-specific scheduling request (e.g., an MO traffic) and, in response to the request, randomly selects one of the RACH resources and, correspondingly, RACH configurations, considering the percentages provided in the RACH steering information. For example, if the available RACH resources for slice 1 (i.e., 30% RACH-1, 60% RACH-2, and 10% common RACH) are again presented as a uniform distribution from 0 to 99, then UE 800 may randomly draw a number between 0 and 99 by using the random number generator, thereby selecting the corresponding RACH resources (and RACH configuration) where the selected number maps onto. As such a distribution is uniform, the size of the sub-ranges (i.e., "0-29", "30-89", and "90-99") implies the likelihood or probability of selecting that RACH configuration. In the embodiment shown in FIG. 10, the UE 800 selects the common RACH resource in a step S1014. Further, the interaction diagram 1000 goes on to a step S1016, in which the UE 800 executes the four-step common RACH procedure based on the selected common RACH resource and the network slice-specific scheduling request. Once the step S1016 is finished, i.e., the four-step common RACH procedure is executed successfully, the interaction diagram 1000 proceeds to a step S1018, in which the UE 800 prepares its report. The UE report is transmitted to the NSMF 400 via the RAN node 600 in a next step S1018. The interaction diagram 1000 ends up with a step S1020, in which the NSMF 400 decides whether to optimize or modify the network slice-specific RACH policy or the network slice-specific resource sharing quota based on the UE report.

It should be noted that each step or operation of the methods 500, 700, 900 and the interaction diagram 1000, or any combinations of the steps or operations, can be implemented by various means, such as hardware, firmware, and/or software. As an example, one or more of the steps or operations described above can be embodied by processor executable instructions, data structures, program modules, and other suitable data representations. Furthermore, the processor-executable instructions which embody the steps or operations described above can be stored on a corresponding data carrier and executed by the processors 402, 602 and 802, respectively. This data carrier can be implemented as any computer-readable storage medium configured to be readable by said at least one processor to execute the processor executable instructions. Such computer-readable storage media can include both volatile and nonvolatile media, removable and non-removable media. By way of example, and not limitation, the computer-readable media comprise media implemented in any method or technology suitable for storing information. In more detail, the practical examples of the computer-readable media include, but are not limited to information-delivery media, RAM, ROM, EEPROM, flash memory or other memory technology, CD-ROM, digital versatile discs (DVD), holographic media or other optical disc storage, magnetic tape, magnetic cassettes, magnetic disk storage, and other magnetic storage devices.

Although the example embodiments of the present disclosure are described herein, it should be noted that any various changes and modifications could be made in the embodiments of the present disclosure, without departing from the scope of legal protection which is defined by the appended claims. In the appended claims, the word "comprising" does not exclude other elements or operations, and the indefinite article "a" or "an" does not exclude a plurality. The mere fact that certain measures are recited in mutually different dependent claims does not indicate that a combination of these measures cannot be used to advantage.

The invention claimed is:

1. A Radio Access Network (RAN) node in a wireless communication network supporting a set of network slices, the RAN node comprising:

a transceiver;

a processor coupled to the transceiver; and a memory coupled to the processor and storing processor-executable instructions, wherein the processor is configured, when executing the processor-executable instructions, to:

generate Random Access Channel (RACH) steering information for the set of network slices, the RACH steering information comprising an indication for a User Equipment (UE) to select one of at least one available RACH configuration with a RACH configuration-specific probability, each of the at least one available RACH configuration comprising at least one of a network slice-specific RACH resource, a network slice-specific back-up RACH resource and a common RACH resource; and by using the transceiver, transmit the RACH steering information to the UE, wherein the processor is further configured to receive at least one network slice-specific resource sharing quota for the set of network slices from a network management entity, and wherein the processor is further configured to generate the RACH steering information based on the at least one network slice-specific resource sharing quota.

2. The RAN node of claim 1, wherein each of the at least one available RACH configuration causes the UE to perform at least one of:

share, at least partly, the network slice-specific RACH resource of at least one network slice of the set of network slices with at least one other network slice of the set of network slices;

share, at least partly, the network slice-specific back-up RACH resource of at least one network slice of the set of network slices with at least one other network slice of the set of network slices; or use, at least partly, the common RACH resource for at least one network slice of the set of network slices when a RACH fallback procedure is initiated for the at least one network slice.

3. The RAN node of claim 1, wherein the processor is further configured to receive at least one network slice-specific RACH policy for the set of network slices from a network management entity, and wherein the processor is further configured to generate the RACH steering information based on the at least one network slice-specific RACH policy.

4. The RAN node of claim 3, wherein the processor is further configured, by using the transceiver, to:

receive a UE report from the UE, the UE report comprising:

an indication of a RACH configuration selected among the at least one available RACH configuration based on the RACH steering information;

an execution duration of a RACH procedure based on the selected RACH configuration; and an indication of whether the UE has experienced a RACH configuration-related collision during the RACH procedure; and forward the UE report to the network management entity.

5. The RAN node of claim 1, wherein the processor is further configured to generate the RACH steering information based on at least one of:

a load on the network slice-specific RACH resources among the set of network slices;

a load on the network slice-specific back-up RACH resources among the set of network slices;

a load on the common RACH resource among the set of network slices; or an expected traffic load for each network slice of the set of network slices.

6. The RAN node of claim 5, wherein the processor is further configured, by using the transceiver, to:

receive a UE report from the UE, the UE report comprising:

an indication of a RACH configuration selected among the at least one available RACH configuration based on the RACH steering information;

an execution duration of a RACH procedure based on the selected RACH configuration; and an indication of whether the UE has experienced a RACH configuration-related collision during the RACH procedure; and based on the UE report, decide whether to modify the RACH steering information.

7. The RAN node of claim 1, wherein the network slice-specific RACH resource, the network slice-specific back-up RACH resource and the common RACH resource of each of the at least one available RACH configuration correspond to a two-step or four-step RACH procedure.

8. The RAN node of claim 1, wherein the processor is further configured to transmit the RACH steering information to the UE via at least one of broadcast signaling and a dedicated signaling.

9. The RAN node of claim 8, wherein the processor is further configured to encode the RACH steering information into a set of Unified Access Control (UAC) parameters and transmit the set of UAC parameters to the UE via the broadcast signaling.

10. A network management entity in a wireless communication network supporting a set of network slices, the network management entity comprising:

a processor; and a memory coupled to the processor and storing processor-executable instructions, wherein the processor is configured, when executing the processor-executable instructions, to:

generate at least one network slice-specific Random Access Channel (RACH) policy or at least one network slice-specific resource sharing quota for the set of network slices, the at least one network slice-specific RACH policy or the at least one network slice-specific resource sharing quota assisting a Radio Access Network (RAN) node in generating RACH steering information for a User Equipment (UE), the RACH steering information comprising an indication for the UE to select one of at least one available RACH configuration with a RACH configuration-specific probability, each of the at least one available RACH configuration comprising at least one of a network slice-specific RACH resource, a network slice-specific back-up RACH resource and a common RACH resource; and provide the at least one network slice-specific RACH policy or the at least one network slice-specific resource sharing quota to the RAN node.

11. The network management entity of claim 10, wherein the network slice-specific RACH resource, the network slice-specific back-up RACH resource and the common RACH resource for each of the at least one available RACH configuration correspond to a two-step or four-step RACH procedure.

12. The network management entity of claim 10, wherein the processor is further configured to receive a UE report from the RAN node, the UE report comprising:

an indication of a RACH configuration selected among the at least one available RACH configuration based on the RACH steering information;

an execution duration of a RACH procedure based on the selected RACH configuration; and an indication of whether the UE has experienced a RACH configuration-related collision during the RACH procedure; and based on the UE report, decide whether to modify the at least one network slice-specific RACH policy or the at least one network slice-specific resource sharing quota.

13. A User Equipment (UE) in a wireless communication network supporting a set of network slices, the UE comprising:

a transceiver;

a processor coupled to the transceiver; and a memory coupled to the processor and storing processor-executable instructions, wherein the processor is configured, when executing the processor-executable instructions, to:

by using the transceiver, receive, from a Radio Access Network (RAN) node, Random Access Channel (RACH) steering information for the set of network slices, the RACH steering information comprising an indication for the UE to select one of at least one available RACH configuration with a RACH configuration-specific probability, each of the at least one available RACH configuration comprising at least one of a network slice-specific RACH resource, a network slice-specific back-up RACH resource and a common RACH resource;

by using the transceiver, receive a network slice-specific scheduling request for a network slice of the set of network slices;

select, from the at least one available RACH configuration, a RACH configuration corresponding to the network slice based on the RACH steering information; and based on the network slice-specific scheduling request and the selected RACH configuration, execute a RACH procedure for the network slice.

14. The UE of claim 13, wherein each of the at least one available RACH configuration causes the UE to perform at least one of:

share, at least partly, the network slice-specific RACH resource of at least one network slice of the set of network slices with at least one other network slice of the set of network slices;

share, at least partly, the network slice-specific back-up RACH resource of at least one network slice of the set of network slices with at least one other network slice of the set of network slices; or use, at least partly, the common RACH resource for at least one network slice of the set of network slices when a RACH fallback procedure is initiated for the at least one network slice.

15. The UE of claim 13, wherein the RACH procedure is a two-step or four-step RACH procedure, and wherein the network slice-specific RACH resource, the network slice-specific back-up RACH resource and the common RACH resource for each of the at least one available RACH configuration correspond to the two-step or four-step RACH procedure.

16. The UE of claim 13, wherein the processor is further configured to receive the RACH steering information via at least one of a broadcast signaling and a dedicated signaling from the RAN node.

17. The UE of claim 16, wherein the RACH steering information is encoded into a set of Unified Access Control (UAC) parameters, and wherein processor is further configured to receive the set of UAC parameters via the broadcast signaling.

18. The UE of claim 13, wherein the processor is further configured, after the RACH procedure is executed by using the selected RACH configuration, to:

generate a UE report comprising:

an indication of the selected RACH configuration;

an execution duration of the RACH procedure based on the selected RACH configuration; and an indication of whether the UE has experienced a RACH configuration-related collision during the RACH procedure; and by using the transceiver, transmit the UE report to the RAN node.

19. The UE of claim 13, wherein the processor is further configured to select the RACH configuration corresponding to the network slice by using a random number generator in accordance with the RACH steering information.

* * * * *